United States Patent [19]

Ferguson

[11] Patent Number: 5,409,316
[45] Date of Patent: Apr. 25, 1995

[54] CROSSED ROLLER BEARING

[75] Inventor: Gregory Ferguson, New Bedford, Mass.

[73] Assignee: Precision Handling Devices, Fall River, Mass.

[21] Appl. No.: 42,203

[22] Filed: Apr. 2, 1993

[51] Int. Cl.$^6$ .......................... F16C 33/34; F16C 33/64
[52] U.S. Cl. ..................................... 384/447; 384/619; 384/537; 384/584; 384/909; 384/565; 384/569
[58] Field of Search .............. 384/447, 619, 537, 584, 384/569, 565, 909

[56] References Cited

U.S. PATENT DOCUMENTS

| | | |
|---|---|---|
| 2,430,359 | 11/1947 | Messinger . |
| 2,607,641 | 8/1952 | Messinger . |
| 3,361,501 | 1/1968 | Messinger et al. . |
| 3,517,975 | 6/1970 | Lonngren et al. . |
| 4,082,383 | 4/1978 | Parmentier et al. . |
| 4,398,775 | 8/1983 | Hofmann et al. . |
| 4,682,901 | 7/1987 | Hauber ..................... 384/539 |
| 4,720,197 | 1/1988 | Scharting et al. ............ 384/49 |
| 4,722,617 | 2/1988 | Stella et al. ................ 384/523 |
| 4,746,232 | 5/1988 | Gugel ........................ 384/619 |
| 4,783,182 | 11/1988 | Caron et al. ................ 384/504 |
| 4,886,377 | 12/1989 | Adachi et al. ................ 384/49 |
| 4,974,972 | 12/1990 | Boosler et al. .............. 384/447 |
| 5,022,768 | 6/1991 | Baxter ....................... 384/19 |
| 5,068,943 | 12/1991 | Estkowski ................... 16/18 |

*Primary Examiner*—Lenard A. Footland
*Attorney, Agent, or Firm*—Martin LuKacher

[57] ABSTRACT

A crossed roller bearing in which the rollers are oriented with their axes of rotation effectively crossed perpendicular to each other can be made from four molded plastic parts which are outer and inner split rings where the outer rings are joined side-by-side and have surfaces extending inwardly from the inner periphery which define a outer V-groove. Sets of rollers are connected at corners of one end face by frangible connections to the inside peripheries of each of the grooves and extend radially inwardly away from the inner periphery. The outer periphery of an inside pair of rings also has faces which form a V-groove opposed to the V-groove of the outer rings, when the inner rings are advanced toward each other and joined inside the outer rings. The ends of the inner rings engage the end faces of the rollers and pivot the rollers, preferably about corners in steps on the faces which form the V-grooves which define fulcrums. Tensile forces are applied to the frangible interconnections which break them and turn the rollers so that they lie in crossed relationship in raceways provided by the opposed grooves. A separator may be located between the rollers to maintain their space relationship in the raceway grooves. Thus, the bearing is assembled from a minimum of four parts and an optional separator. The plastic materials used and the ease of assembly reduces the cost of the bearing significantly below conventional metal crossed roller bearings.

13 Claims, 4 Drawing Sheets

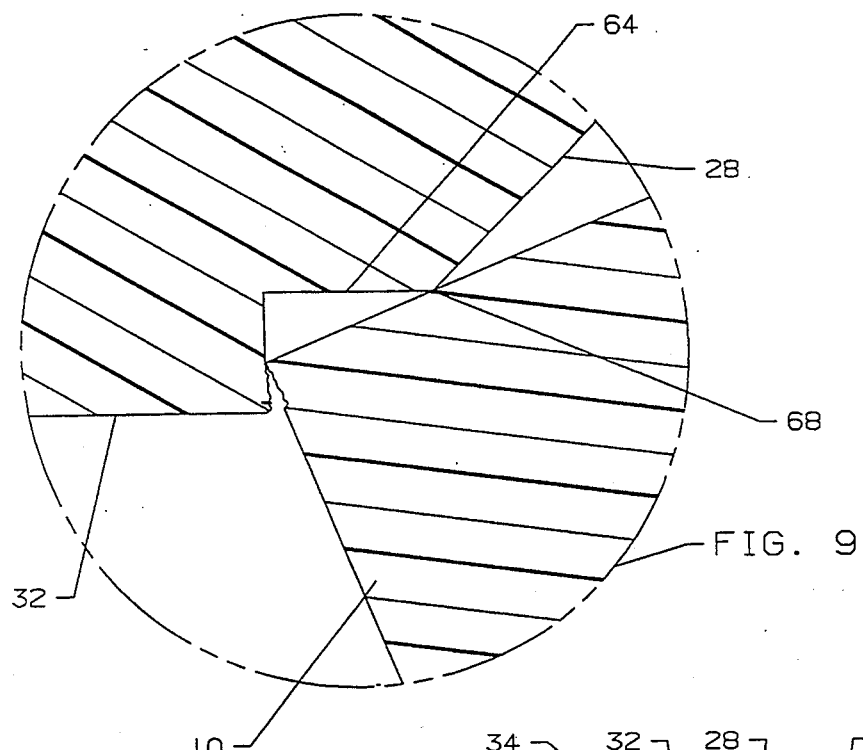
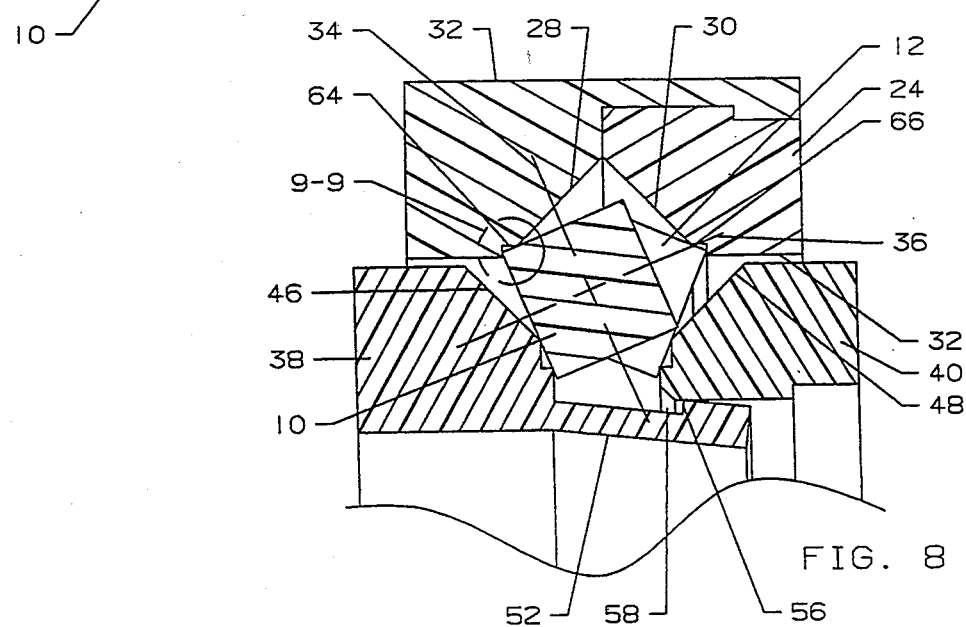
FIG. 9
FIG. 8

CROSSED ROLLER BEARING

The present invention relates to crossed roller bearings and methods of making same, and particularly to a crossed roller bearing which may be fabricated entirely from plastic material.

The invention is especially suitable in providing bearings at much lower cost than conventional metal crossed roller bearings by reducing the number of parts needed to make the bearings as well as facilitating the assembly thereof.

A crossed roller bearing is a bearing wherein rollers are oriented with their axes effectively perpendicular to each other. Then any load applied to the inner or outer race is met by matching rollers perpendicular or in the plane of the load. Crossed roller bearings are supported and roll on inclined surfaces of their raceways.

It is a feature of this invention to enable crossed roller bearings to be made entirely of plastic parts including the rollers thereof. A further feature is to reduce the number of parts from which the bearings are assembled to a minimum of four parts and if a separator of the rollers is desired, just one additional part.

This invention is related to the invention described in the U.S. Patent Application filed by the inventor hereof which describes a needle bearing having needles connected at an end thereof to a ring which is ejected from the bearing upon assembly thereof. This application is identified as Ser. No. 07/856,759, filed Mar. 13, 1992.

The present invention provides a crossed roller bearing which utilizes an outer race formed by rings to which rollers are attached by frangible connections, preferably provided by gates in the process of molding the rollers and rings from plastic materials as in an injection mold. These rollers present their ends to other rings which define opposing faces of the bearing raceway. As these inner rings are joined together, they engage end faces of the rollers and pivot them against the faces of the raceway. Tensile forces are applied to the frangible connections and break these connections so that the rollers can roll freely. Since a set of rollers is connected to one of the rings and another set to the other, they are pivoted in opposite senses and lie with their axes perpendicular to each other in the raceway upon assembly, thereby providing a crossed roller bearing. The ring parts may interfit with each other as male and female parts. Portions of the parts may define latches which deflect and automatically lock the rings together upon assembly. Other interlocking means such as bonding, hot-melt welding, riveting, screwing or press fitting may alternatively be used to maintain the rings and the rollers in assembled relationship.

Accordingly, it is the principal object of the present invention to provide an improved low-cost crossed roller bearing.

It is a further object of the present invention to provide an improved method of assembly of crossed roller bearings which contributes to the low cost thereof.

It is a still further object of the present invention to provide improved crossed roller bearings which may be fabricated entirely out of plastic parts.

The foregoing and other objects, features and advantages of the invention will become more apparent from a reading of the following description in connection with the accompanying drawings in which.

Figure 2:
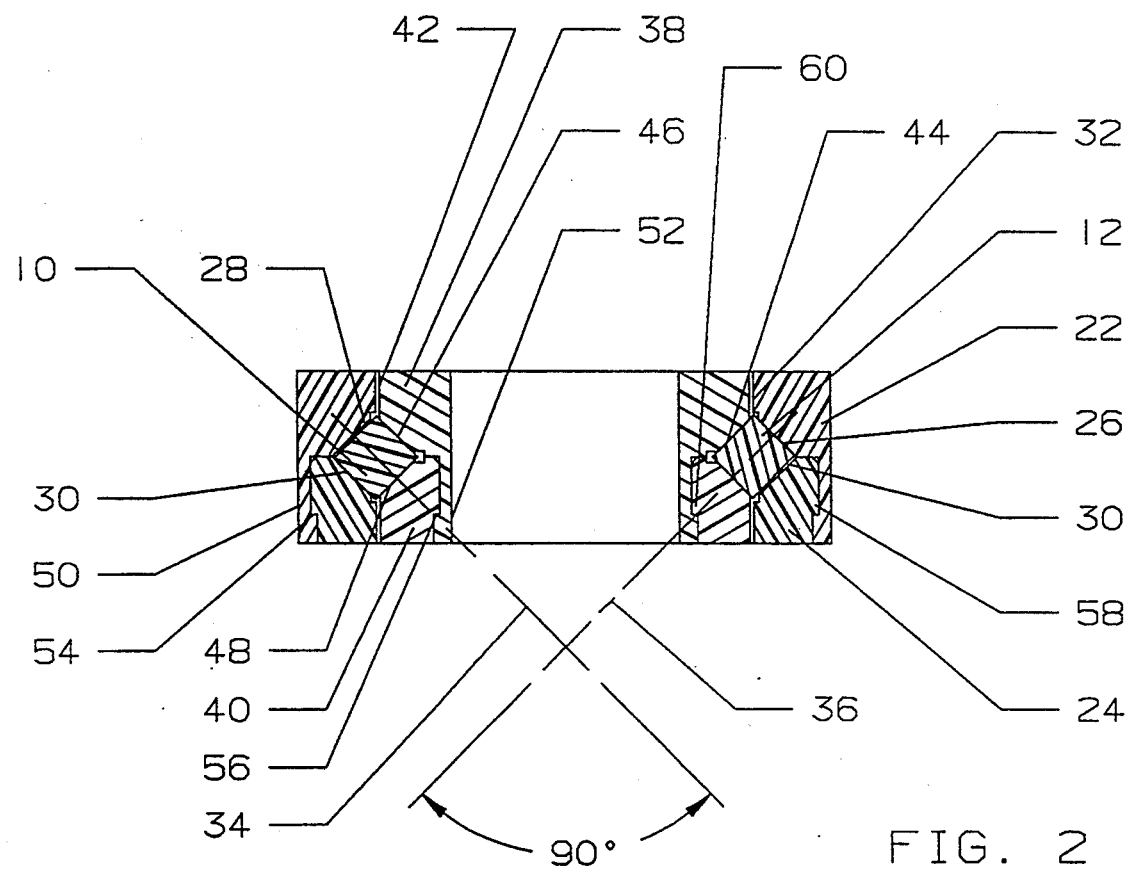
FIG. 2 is a cross-sectional view of the bearing shown in FIG. 1 taken along the line 2—2 in FIG. 1.
Figure 1:
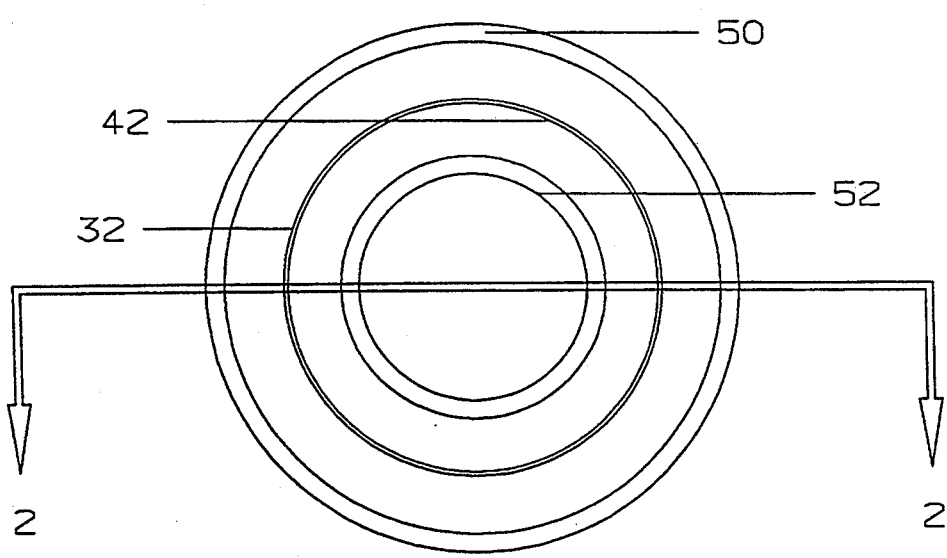
FIG. 1 is a bottom plan view of a crossed roller bearing embodying the invention.
Figure 3A:
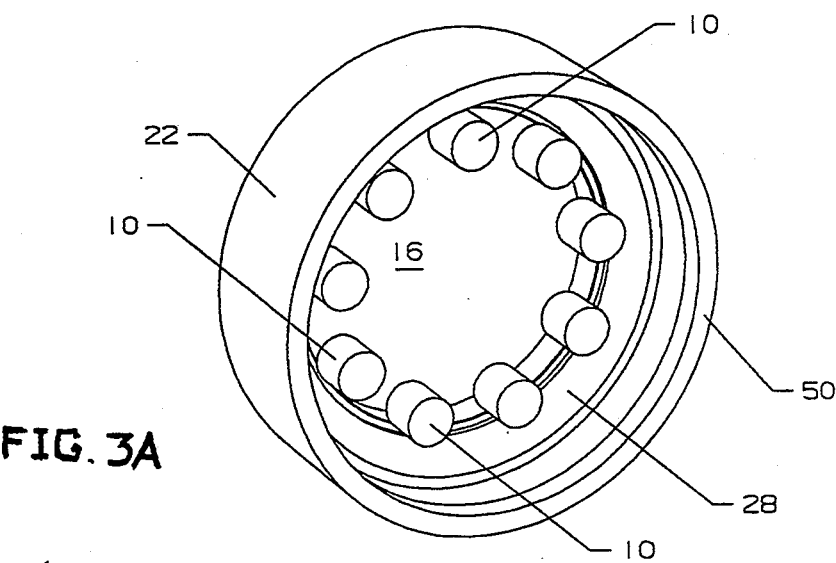
Figure 3B:
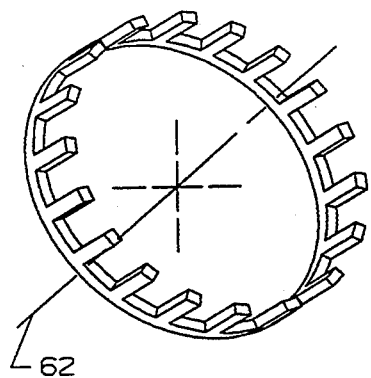
Figure 3C:
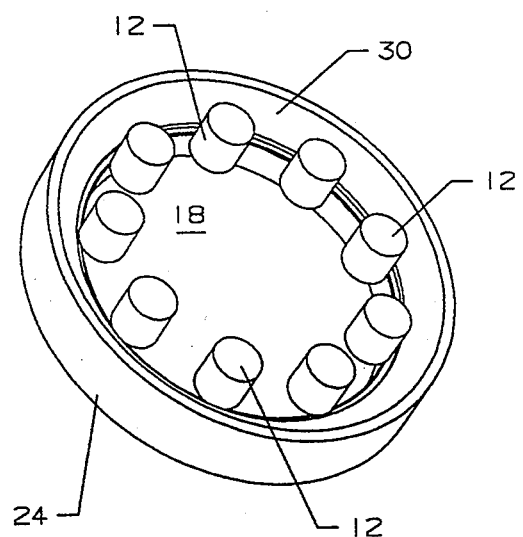
Figure 4:
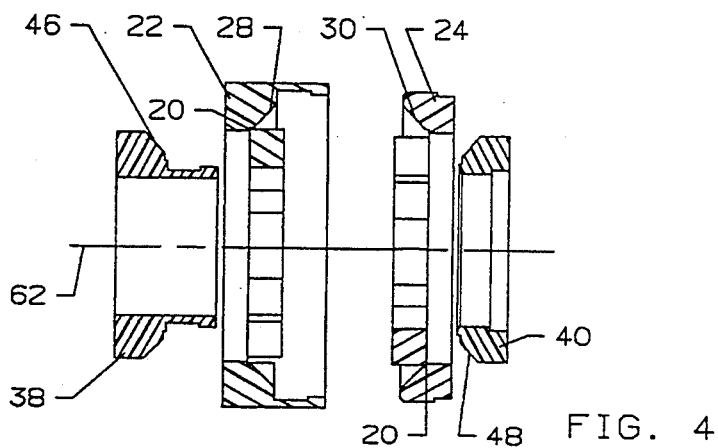
Figure 6:
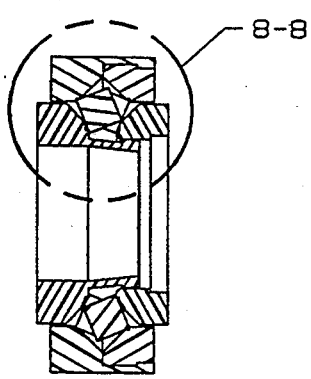

FIG. 3 shown as FIGS. 3A, 33 and 3C, represent views, in exploded relationship, of the outer ring part and the optional roller separation element of the bearings shown in FIGS. 1 and 2 before assembly;

FIGS. 4, 5, 6 and 7 are sectional views illustrating the bearing in successive stages of assembly;

FIG. 8 is an enlarged view of part of FIG. 6 in the area within the annular line 8—8; and FIG. 9 is a further enlarged view of the portion of this area within the circular line 9—9.

Referring to FIGS. 1 and 2, there is shown a roller bearing with crossed rollers 10 and 12. The rollers 10 and 12 are members of different sets of rollers 16 and 18 which are circumferentially spaced in interleaved relationship in the bearing. These rollers are connected initially by frangible connections, shown at 20 in FIG. 9, in process of being fractured. The rollers 10 of one of these sets 16 is connected to a ring 22. The rollers 12 of the other set 18 are connected to another ring 24 (see also, FIG. 3). These rings 22 and 24 constitute a split ring assembly. An annular (circular) V-groove 26 is formed by faces 28 and 30 which define the inner periphery 32 of the assembled split rings 22 and 24. The rollers 10 roll on the face 28 while the rollers 12 roll on the face 30. The axes 34 and 36 of the rollers 10 and 12 are perpendicular (at 90°) and provide crossed roller bearing operation.

An inner pair of split rings 38 and 40 have an outside peripheral surface 42 spaced from the inside peripheral surface 32 because the maximum inside diameter of the rings 22 and 24 is greater than the outside diameter of the rings 38 and 40. The inside peripheral surface 42 has a V-grooved 44 defined by the inwardly inclined faces 46 and 48 of the surface 42. The V-grooves 26 and 44 are opposed to each other and capture or sandwich the rollers 10 and 12 therebetween. The apparel faces 28 and 48 provide a raceway surface on which the rollers 10 roll. The faces 30 and 46 are also opposed and define the raceway rolling surfaces for the rollers 12.

The rings 22 and 38 of the outside and inside split rings are female parts having flexible flange portions 50 and 52 with steps 54 and 56. These steps 54 and 56 deflect the flanges 50 and 52 and latch over complimentary steps 58 and 60 in the rings 24 and 40, which are male parts of the split ring assemblies, thereby interlocking the split rings upon assembly. The deflection and interlocking operation for the flange 52 at the steps 56 and 58 is shown in FIG. 8.

A separator 60 having fingers which define opposed ways 62 and 64 in which the rollers 10 and 12 may be disposed when the bearing is assembled may optionally be used to maintain the rollers in each set 16 and 18 separated in circumferentially spaced relationship. The use of the separator is optional.

The outer split rings 22 and 24 and the inner split rings 38 and 40 (the outer split rings having the rollers 10 and 12 attached prior to assembly) constitute the minimum parts of the bearing and consist of only four parts. If the separator is included, there are five parts. All of the parts are made of plastic, and are preferably injected molded from plastic. Suitable plastics may be polycarbonate. In which case, it may be desirable to fill the plastic with glass or polytetrafluoroethylene (Teflon) particles or glass particles to reduce friction. The parts may be made from another material, namely, a polyimide of the type which is adapted to the injection molding process.

Figure 5:
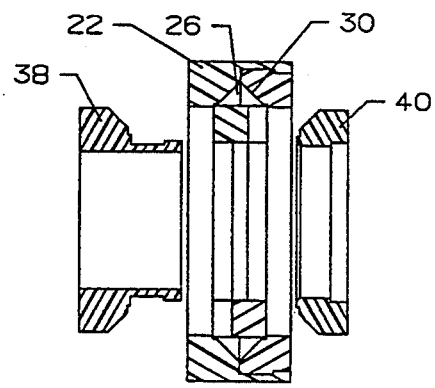

The assembly of the bearing will become more apparent from FIGS. 4-9. First, all of the parts are disposed in coaxial relationship along the axis 62 of the bearing. The rollers 10 and 12 are attached by their frangible connections 20 which may be gates formed during the molding process of the rings 22 and 24. The rollers have their axes 34 and 36 parallel to the bearing axis 62. The outer ring parts are then brought and latched (snapped together) to form the outer assembly as shown in FIG. 5. Then, the inner ring parts 38 and 40 are brought together as illustrated in FIG. 6 and in the enlarged views of FIGS. 8 and 9. A feature of this invention is that the frangible connections are broken by applying tensile forces thereto. These tensile forces are afforded by annular steps 64 and 66 adjacent to the edges of the faces 28 and 30 and the cylindrical surface 32 of the assembled outer split ring parts 22 and 24. As the inner ring parts 38 and 40 are brought together (as in a press), they engage the circular end faces of the rollers 10 and 12 and pivot the rollers. The cylindrical sides of the rollers engage corners 68 between the V-grooved faces 28 and 30 and the steps 64 and 66. These corners 68 act as fulcrums for each of the rollers, causing tensile stresses to be applied at the frangible connections and shear the frangible connections without damaging or indenting or otherwise distorting the rolling cylindrical faces of the rollers 10 and 12.

Figure 7:
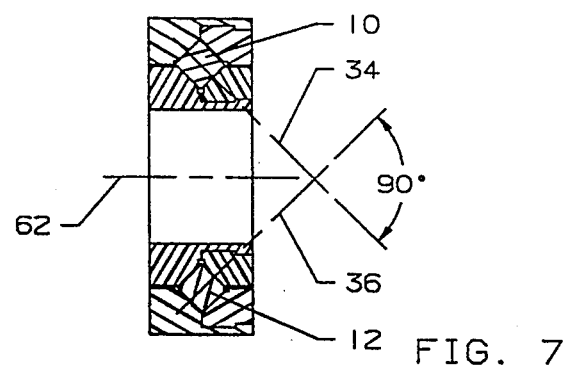

The assembled bearing is shown in FIG. 7, which is identical but rotated 90° to FIG. 2.

From the foregoing description, it will be apparent that there has been provided an improved crossed roller bearing and method of fabricating same. Variations and modifications in the herein described bearing and methods, within the scope of the invention, will undoubtedly suggest themselves to those skilled in the art. For example, the rollers may be attached to inner split rings in a modified design. Accordingly, the foregoing description should be taken as illustrative and not in a limiting sense.

I claim:

1. In a roller bearing having a plurality of parts including a plurality of rollers in canted relationship the improvement which enables all of said parts to be parts molded from plastic material characterized in that said parts comprise a second pair of joined split rings and a first pair of joined split rings which encircle said second pair of joined split rings, said rings of each of said pairs being joined to define an annular groove having faces forming raceways in which said rollers are disposed, said rollers having faces at the opposite ends of annular peripheries thereof, said rollers being initially joined to the split rings of one of said first and second pair of split rings by frangible plastic connections extending between edges of said end faces of said rollers and edges of said one of said pairs of split rings which define said faces forming the raceway thereof, which connection are fractured by engagement of said rollers by the other of said first and second pair of split rings upon joinder thereof.

2. The bearing according to claim 1 wherein a first set of said rollers are initially joined to one of said first pair of rings and a second set of said rollers are initially joined to the other of said first pair of rings in circumferentially spaced relationship so that said rollers and said first set are disposed in said raceway in interleaved relationship with the rollers of said second set.

3. The bearing according to claim 2 wherein said faces of said first pair of rings define a first annular V-groove and said faces of said second pair of parts define a second annular V-groove opposed to said first V-groove, said opposed V-grooves having first and second opposed sides, said first opposed sides defining surfaces on which said first set of rollers roll and said second opposed sides defined surfaces on which said second set of rollers roll.

4. The bearing according to claim 2 wherein the axes of said rollers in said first set are offset 90° with respect to the axes of the rollers in said second set.

5. The bearing according to claim 4 wherein said polymer has particles selected from the group consisting of polytetraflouroethylene and glass distributed therein.

6. The bearing according to claim 4 wherein said polymer is selected from the group consisting of polyimide and polycarbonate.

7. The bearing according to claim 1 wherein said one of said first pair of rings and one of said second pair of parts is received as a male part respectively inside the other of said first pair of rings and the other of said record pair of pair of rings in latching relationship therewith.

8. The bearing according to claim 7 wherein said male parts have a step, and said other of said pairs of parts have walls which are flexible and deflectable over said steps and interlock in said latching relationship therewith.

9. The bearing according to claim 1 wherein the parts from which said bearing is fabricated consists of four parts which are one of said pair of first and second split rings with said rollers attached thereto by said frangible connections and the other of said pair of split rings.

10. The bearing according to claim 9 wherein said parts optionally include a fifth plastic part providing a separator having ways in which said rollers are disposed circumferentially distributed about said annular groove.

11. The bearing according to claim 1 wherein said faces of said grooves through which said rollers are connected have steps adjacent to said edges which define corners providing fulcrums about which said rollers pivot to apply tensile forces to said connections for the fracture thereof.

12. The bearing according to claim 1 wherein said first pair of rings having an inside diameter and said second pair of rings have an outside diameter less than said inside diameter so as to provide clearance enabling said first pair of rings to rotate with respect to said second pair of rings while said rollers roll therebetween, said edges of said faces where said frangible connections from said rollers are connected being along said inside diameter of the rings of said first pair of rings.

13. The bearing according to claim 1 wherein said plastic material is a polymer.

* * * * *